United States Patent Office 3,452,326
Patented June 24, 1969

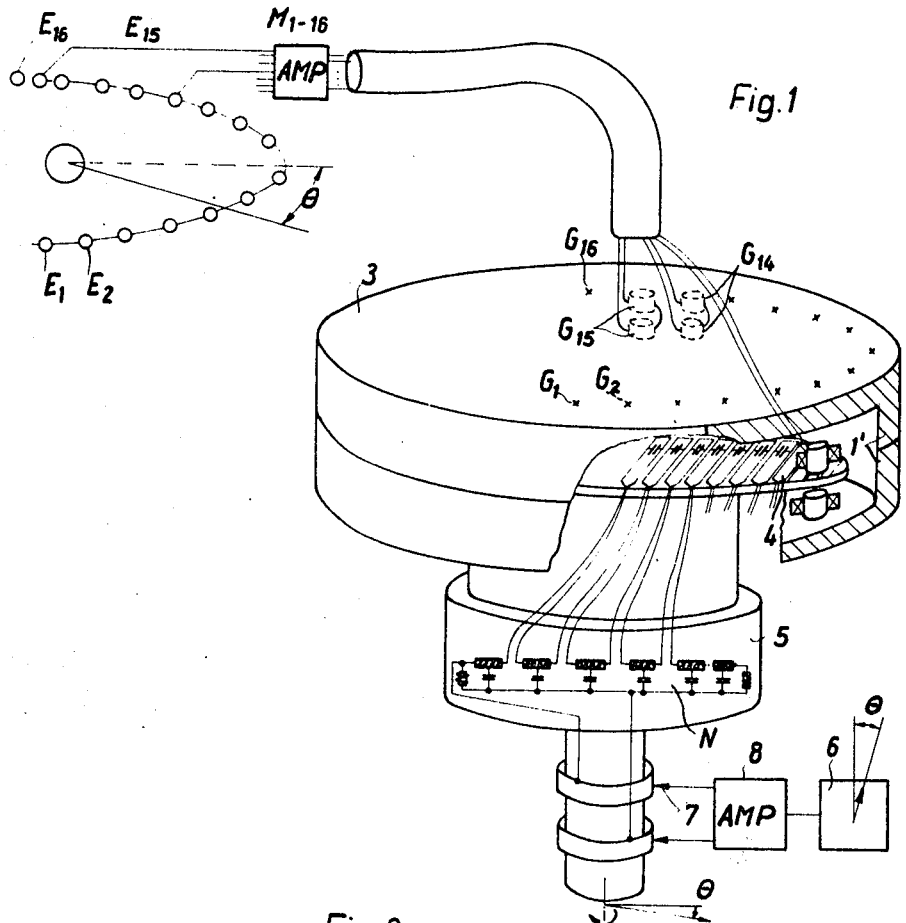
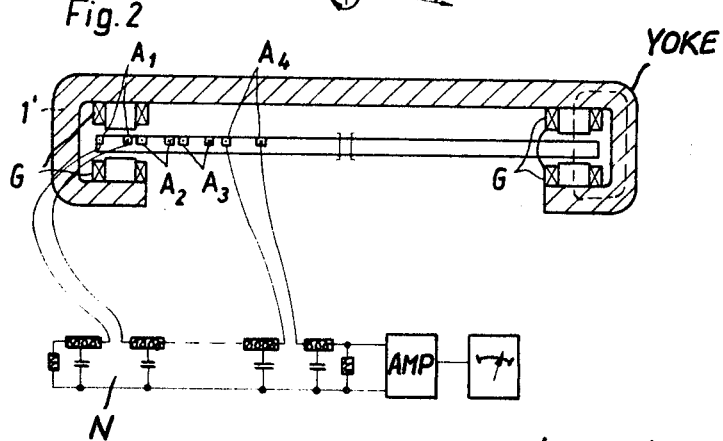

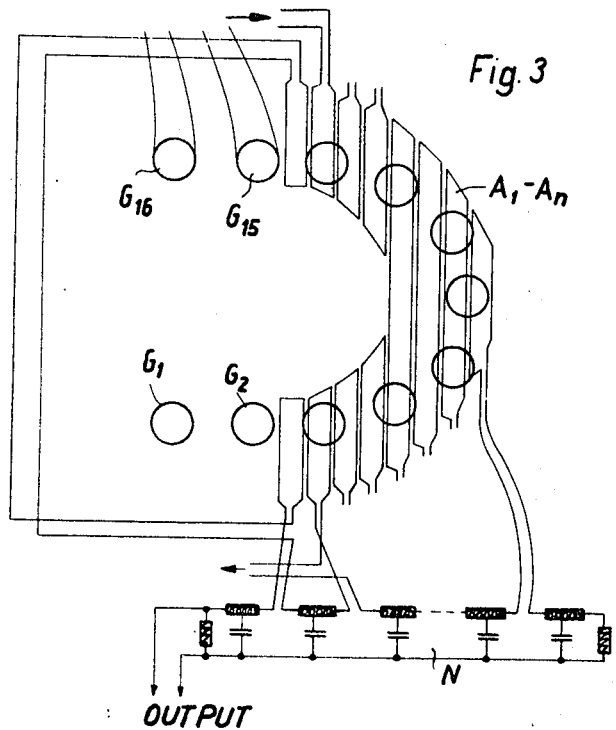
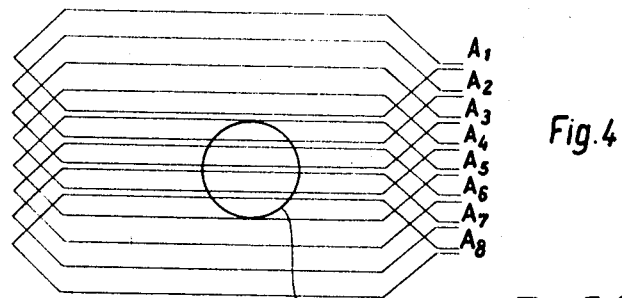
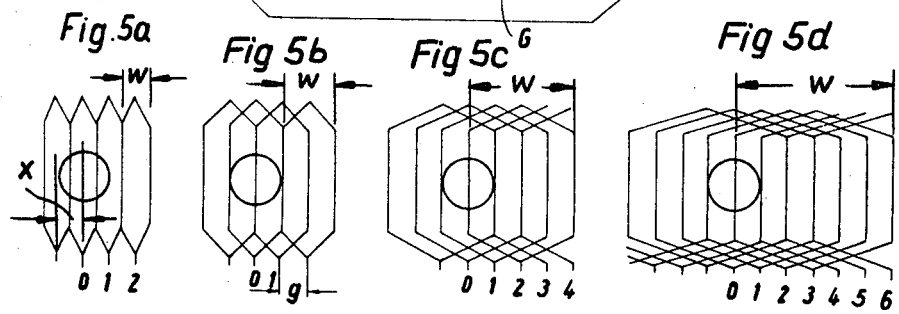

3,452,326
APPARATUS FOR MEASURING THE DIRECTION OF INCIDENT WAVES
Reinhard W. Leisterer and Gerd Hemmie, Bremen, Germany, assignors to Fried. Krupp Gesellschaft mit beschrankter Haftung, Essen, Germany
Filed Jan. 29, 1968, Ser. No. 701,252
Claims priority, application Germany, Jan. 27, 1967, B 90,917
Int. Cl. H04b 13/02; G01s 3/80
U.S. Cl. 340—6
20 Claims

ABSTRACT OF THE DISCLOSURE

Apparatus for measuring the direction of propagation of waves, such as sound waves in water. The apparatus includes a group of receivers for detecting the waves and a compensator, connected thereto, for equalizing the differences in transit time of plane fronts of the waves incident on the individual receivers. The compensator includes a delay line and a switching network connecting the group of receivers with the delay line. The switching network comprises, more particularly, a group of sender coils, each of which is connected with an individual receiver and a group of receiver coils, each of which is connected to a point on the delay line. The sender coils and receiver coils are movably arranged with respect to each other such that each sender coil is simultaneously inductively coupled with at least two adjoining receiver coils. This switching network therefore provides an interpolation between the discrete angles of incidence of the detected waves which would be measured were each of the sender coils coupled to only a single receiver coil.

Reference to related application

The subject matter of this application is related to that disclosed in copending application Ser. No. 699,869, filed Jan. 23, 1968, of Gerd Hemmie and Egidius Arens.

Background of the invention

The present invention relates to apparatus for measuring the direction of propagation of incident waves, such as sound waves in water, by means of a geometrically arranged group of wave receivers and a compensator connected thereto having a delay line network for equalizing the transit time differences of the plane wave fronts incident on the receivers.

In the apparatus described in the related application referred to above, the groups of switching elements of the compensator are constructed so that each individual sender element is simultaneously coupled with more than one receiver element and the degree of coupling is dependent in continuous fashion upon the relative geometric position of the switching elements. As is described in detail in the related application, this apparatus is able to thus achieve an interpolation between the discrete angles of incidence of the detected waves which would be measured if each of the sender elements were coupled to only a single receiver element at a time.

According to the preferred embodiment of the apparatus described in the related application, the switching elements are constructed as contacts which are coupled by a conductive fluid having a specific resistance sufficiently high so that the resistance between adjoining switch contacts may be neglected when compared to the corresponding resistance between the points of the delay line network to which the contacts are coupled.

Summary of the invention

An object of the present invention is to design a continuously variable compensator for incident wave direction-finding apparatus of the type described in the related application, which is compact, highly reliable, and is inexpensive to manufacture.

This as well as other objects which will become apparent in the discussion that follows are achieved, according to the present invention, by constructing the switch elements of the compensator as induction coils and arranging the receiver elements with respect to the sender elements such that each sender element is inductively coupled to at least two receiver elements. This arrangement thus provides the interpolative effect between the discrete angles of incidence of the detected waves measured if each of the sender elements were coupled to only a single receiver element at a time and permits the compensator to operate without the physical contact between the respective sender and receiver elements.

The sender coils employed in the compensator according to the present invention may be constructed as either toroidal or equilateral polygonal coils; the receiver coils may be designed as elongated planar coils.

The desired degree of coupling may be effected within the proper tolerances without requiring a high degree of accuracy in the manufacture of the coils if the sender coils are made in two separate halves and arranged coaxially in such a way that the receiver coils are sandwiched between them.

It is sufficient if the receiver coils extend only over the area over which the sender coils pass when the compensator switch is operated. In particular, when the wave receiver group is arranged in the shape of an arc of a circle, the receiver coils may be made to extend over sections of arc which have equal projections on the axis of symmetry of the aggregate or entire arc. According to a preferred embodiment of the present invention, the receiver coils may all be made the same shape and connected together to form various sized groups which satisfy the stated condition. This arrangement not only offers obvious advantages in the fabrication of the compensator, but also makes it possible to achieve a prescribed gradation in the output amplitudes by providing the different receiver coils with different numbers of turns.

Brief description of the drawings

FIGURE 1 is a partial perspective view, partially schematic diagram of the mechanical and electrical components of the apparatus according to the preferred embodiment of the present invention.

FIGURE 2 is a cross-sectional view through a portion of the switching network of the compensator of FIGURE 1 and a schematic diagram of the delay line network connected thereto.

FIGURE 3 is a plan top view of the switching network of the compensator of FIGURE 1 and a schematic diagram of the delay line network connected thereto.

FIGURE 4 is a plan top view of a portion of another form of arrangement of the switching elements of the compensator of FIGURE 1 having a circular sender coil and overlapping loop-shaped receiver coils.

FIGURES 5a, 5b, 5c and 5d are plan top views of portions of alternative arrangements for the switching network of the apparatus of FIGURE 1. The receiver coils of these arrangements overlap each other in varying degrees.

*Description of the preferred embodiments*

Figure 6:
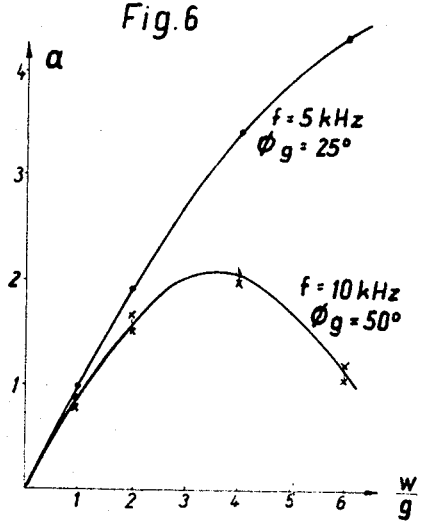
FIGURE 6 is a graph which illustrates the various coupling functions for the coil arrangements of FIGURES 5a–5d.

Referring now to FIGURE 1, there is shown a sonar system having a group of receivers $E_1$ through $E_{16}$ arranged in a horseshoelike configuration and connected through preamplifiers $M_1$ through $M_{16}$ to a corresponding conformal group of sender switch elements $G_1$ through $G_{16}$ in an electrical compensator. These sender elements are located in a two-part casing 1' and interact with a group of receiver elements $A_1$ through $A_n$ which, in turn, are connected to various points on the delay line N.

Instead of the electrolytic coupling of sender and receiver contacts as disclosed in the related application Ser. No. 699,869, referred to above, the present invention provides an inductive interaction or coupling between the sender and receiver elements. The principal manner of operation of this inductive coupling is schematically illustrated in FIGURE 2. Sender and receiver switch elements consist of coils which are electromagnetically coupled and arranged to move relative to each other a given distance apart. In order to make the inductive coupling between the sender coils G and the receiver coils A substantially independent of their separation, the sender coils are subdivided into two halves which are arranged on a common axis, one above and the other below the receiver coils. Small changes in the axial distance between the sender coils and the receiver coils have therefore no influence on the coupling; this arrangement minimizes the requirements for accuracy in the construction of the coil arrangements.

In the particular case illustrated wherein the receiver group is in the shape of a horseshoe, the sender coils consist of circular coils and the receiver coils consist of conductor loops which are connected between the series elements of the delay line network N. These conductor loops lie in a plane and, if necessary, can individually consist of several windings. As is illustrated in FIGURE 3, the receiver coils $A_1$ through $A_n$ arranged to extend only over the region over which pass the sender coils $G_1$ through $G_{16}$.

To provide strong coupling and continuous phase compensation, that is, interpolation of the transit time between neighboring receiver coils or points on the delay line, the magnetic flux of the sender coils must be simultaneously coupled to at least two receiver coils. This may be achieved by making the sender coils large in diameter or by providing a correspondingly large number of receiver coils and delay line elements. Both of these possibilities are limited, however. The maximum diameter of the sender coils is limited by the mutual separation between individual sender coils. If the permissible size for the compensator is given, there is a maximum center-to-center separation between the sender coils which is determined by the scale between the optimum dimensions of the wave receiver group and the size of the compensator. The number of delay line elements also can not be made arbitrarily large because of limitations on space.

A further solution would be to increase the surface area of the reeciver coils such that, in accordance with the coupling desired, two or more receiver coils, successively overlap, as shown in FIGURE 4. The adjoining receiver coils which are, in turn, connected to adjoining elements of the delay line network have a center-to-center distance which corresponds to the distance which sound travels in water during the transit time of a delay line element. In FIGURE 4, the circular sender coil G is inductively coupled with the receiver coils $A_2$ through $A_8$.

FIGURE 2, which is a partly schematic, partly cross-sectional view of a portion of the compensator of FIGURE 1, illustrates the principle of operation of the interpolative inductive compensator according to the present invention. The cores of the two halves of the sender coils G are mounted on magnetic yokes which provide a path for the return of the magnetic flux external to the coils. There is no reciprocal influence upon the sender coils since the magnetic resistance in the yoke is negligible compared to the resistance in the air gap between the two coil halves.

Concerning the relative impedance of the coil arrangement, it should be noted that the overlapping receiver coils effect an inductive coupling between the elements of the delay line network, and can change the characteristic impedance as well as the transit time of a given network. Although such inductive coupling can, in principle, be accounted for in the calculation of the transit time, it is undesirable since the moving sender coils change the permeability and, in turn, vary the coupling between the delay line elements when the compensator is rotated. The inductance of the receiver coils should therefore be made negligibly small compared to the inductance of the individual series branches of a delay element in the delay line network if any are connected in series therewith and very large compared to these inductances if any are connected in parallel therewith. The inductive reactance of the sender coil, on the other hand, should be made much larger than the output impedance of the preamplifiers $M_1$ through $M_{16}$ so that variations in the sender coil inductance will produce only negligible variations in the signal. The signal level drop between the output of the preamplifiers and the output of the delay line network may therefore amount to 50 to 70 db.

The following should also be noted concerning the interpolation and the degree of coupling of the inductively coupled compensator. As may be appreciated from the illustration of FIGURE 2, the entire flux generated by the sender coils flows through surface areas enclosed by the receiver coils which lie between the two halves of the sender coils. The degree of coupling can therefore be calculated using the areas which are simultaneously enclosed by the sender coils and the receiver coils; that is, areas which participate in the coupling. If the phase delay of a single delay line element is designated $\phi_g$, the surface area of the sender coil $S_{sc}$ and the area which is common to the sender coil and the $i^{th}$ receiver coil $S_i$, the coupling is increased with respect to the coupling of nonoverlapping receiver coils (that is, coils which lie side by side) by the factor $$a = \frac{1}{S_{sc}} \cdot \sum_{i=1}^{k} S_i \cdot e^{j \cdot i \cdot \phi_g}$$

wherein $k$ is the number of receiver coils which at a time are magnetically coupled to one sender coil.

FIGURES 5a, 5b, 5c and 5d illustrate four receiver coil arrangements having a constant-diameter sender coil and receiver coils of constant center-to-center distance $g$ and of differing width $w$. The diameter of the sender coil, e.g., corresponds to 4 cm. of water travel; it therefore corresponds to a value below the maximum value of permissible receiver separation $d \leq 0.5\lambda_0$ where $\lambda_0$ is the wavelength of sound in water at the highest operating frequency: 15 kHz. The step distance of the delay line element corresponds to 2 cm. of water travel. In these figures $x$ means the lateral distance between the sender and receiver coils measured in the plane of motion.

Figure 7:
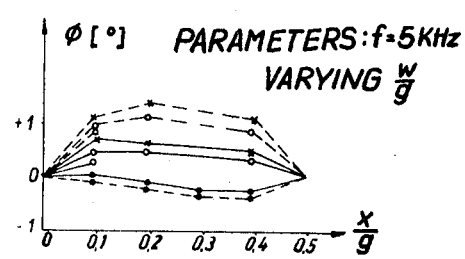
FIGURE 7 is an error diagram which relates to FIGURES 5a–5d and 6.

The related curves as shown in FIGURES 6 and 7 provide information about behavior of the various arrangements of FIGURES 5a–5d. The phase interpolation error $\phi$ shown in FIGURE 7 plotted over the lateral relative distance $x/g$ between the centers of sender and receiver coils is very favourable; in all cases, it is below 6% of the phase shift of a delay line element at a frequency of $f=5$ kHz. The degree of coupling, however, can be seen in FIGURE 6 to be strongly dependent upon frequency when the receiver coils are large in width. The relative width of the receiver coils should therefore preferably be chosen that the ratio between the width $w$ and the step distance $g$ of adjoining receiver coils does not exceed the value $2(w/g=2)$. Even then, the degree of coupling provided by such an arrangement is still about 5 db greater than with the loop-shaped receiver coils which are arranged side by side.

The compensation for a wave receiver group arranged in a circle can also be provided by receiver coils which are designed to extend only over the area over which the sender coils directly pass. Such an arrangement may be seen in FIGURE 8. The receiver coils there extend over lengths of arc which have equal projections on the axis of symmetry of the aggregate arc. It is also possible in this regard, to provide receiver coils of identical shape, as shown in FIGURE 9, and join them in series into groups which, as do the individual coils of FIGURE 8, extend over sections of arc having equal-length projections on the axis of symmetry of the entire arc.

Figure 8:
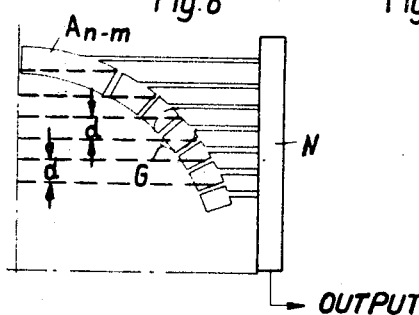
FIGURE 8 is a plan top view of a portion of a switching coil arrangement for a group of wave receivers arranged in a circle, or arc of a circle.
Figure 9:
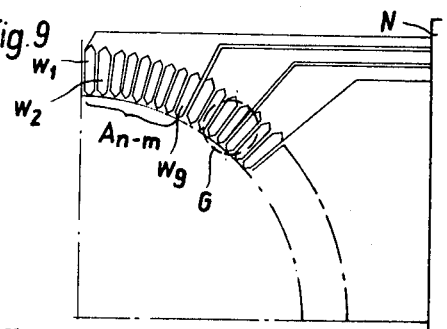
FIGURE 9 is a plan top view of a variation of the coil arrangement of FIGURE 8 which provides a gradation of output amplitudes.

Thus, for example, the receiver coil $A_{n-m}$ can either consist of a single coil, as shown in FIGURE 8, or of nine identical subcoils $W_1$ through $W_9$, connected in series as shown in FIGURE 9. If the latter arrangement is chosen, the remaining receiver coils are also comprised of identical series-connected subcoils. The number of windings in the subcoils is decreased from a maximum at the center of the axis of symmetry to a minimum at both its ends at a rate which achieves a desired progressive amplitude shading. As is well known, such a shading of amplitudes make it possible to influence the shape of the beam pattern; in particular, the sidelobes of the beam pattern may thereby be suppressed. Details on shading principles can be found in "J. W. Horton: Fundamentals of Sonar," United States Naval Institute, Annapolis, Md., 1957, pp. 180 to 184.

Figure 10:
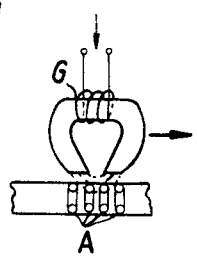
FIGURE 10 is an elevational plan view of a switching coil arrangement having a horizontal field configuration.
Figure 11:
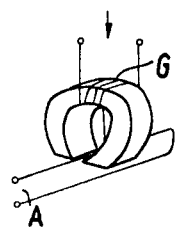
FIGURE 11 is a perspective view illustrating how the coil arrangement of FIGURE 10 may be employed to provide a gradation of amplitudes.

In all of the embodiments described above, it has been assumed that the sender coils generate a field which is directed perpendicular to the plane of motion of the coil arrangement. FIGURES 10 and 11 illustrate a coil arrangement in which the effective magnetic field produced by the sender coils G is essentially oriented parallel to the plane of motion of the sender coils B. This is accomplished by employing a horseshoe-shaped core within the receiver coil G. It is advantageous here to orient the receiver coils A so that the planes of their winding loops are parallel to each other and perpendicular to the plane of motion.

The magnetic coupling between sender coil and receiver coil is maximum if the direction of the magnetic flux of the sender coil is perpendicular to the plane of the winding loops of the receiver coils and drops with the sine of the angle between said flux direction and said plane. Adjusting the flux directions of the sender coils belonging to a circular array of wave receivers radially a cosine shading is effected, for said angle varies corresponding to the angular position of each sender coil relative to the plane of the winding loops of all receiver coils.

It will be understood that the above description of the present invention is susceptible to various modifications, changes, and adaptations.

We claim:
1. A device for measuring the direction of propagation of waves comprising, in combination:
 (a) a plurality of receiver means arranged for detecting said waves;
 (b) a compensating delay line; and
 (c) switch means, connecting said receiver means with said delay line, comprising:
  (1) a plurality of sender coils, each of said sender coils being connected to one of said receiver means and arranged to generate an effective magnetic field in a given direction; and
  (2) a plurality of receiver coils, each of said receiver coils
   (i) being connected to a point on said delay line,
   (ii) being arranged to move relative to said sender coils in a plane substantially transverse to said given direction,
   (iii) being arranged to enclose an area which forms a surface substantially parallel to said plane of motion and
   (iv) being simultaneously inductively coupled with a plurality of adjoining ones of said receiver coils, whereby said switch means provides for an interpolation between the discrete angles of incidence of said waves which would be measured if each of said sender coils were coupled to only a single receiver coil at a time.

2. The device defined in claim 1, wherein said sender coils and said receiver coils are arranged so that the degree of said coupling is in continuous dependence upon the position of said coils with respect to each other.

3. The device defined in claim 1, wherein said switch means is continuously adjustable.

4. The device defined in claim 1, wherein said receiver means are arranged in a geometric configuration.

5. The device defined in claim 4, wherein said sender coils are arranged in a geometric configuration conformal to the geometric arrangement of said receiver means.

6. The device defined in claim 1, wherein said waves are sound waves propagating in water.

7. The device defined in claim 1, wherein said sender coils are toroidal coils.

8. The device defined in claim 1, wherein said sender coils are equilateral polygonal coils.

9. The device defined in claim 1, wherein said receiver coils are elongated planar coils.

10. The device defined in claim 1, wherein said receiver coils are arranged to enclose only that area through which the magnetic flux generated by said sender coils passes.

11. The device defined in claim 5, wherein said receiver means are arranged in a first circular arc and said receiver coils are arranged in a plurality of portions of a second circular arc, said portions extending along said second arc for an angular distance such that all of said portions form the same length of projection on the axis of symmetry of said second arc.

12. The device defined in claim 1, wherein said delay line includes a plurality of series coils each adjoining two of which are interconnected through at least one of said receiver coils, and wherein the impedance of said receiver coils is small compared to the impedance of either of said adjoining two series coils.

13. The device defined in claim 1, wherein said delay line includes a plurality of series coils, each one of which is connected in parallel to one of said receiver coils, and wherein the impedance of said one receiver coil is large compared to the impedance of said one series coil.

14. The device defined in claim 1, wherein said delay line includes a plurality of delay line elements and said receiver coils each enclose an area having a width which does not exceed a value which is twice the distance between the centers of adjoining receiver coils.

15. The device defined in claim 1, wherein said surface formed by each receiver coil overlaps the surface formed by at least one other of said receiver coils.

16. The device defined in claim 1, wherein said receiver coils are arranged to lie side by side without gaps between successive ones of said receiver coils.

17. The device defined in claim 11, wherein said receiver coils are all identical in shape and are arranged in a plurality of groups, and wherein each one of said groups is arranged to extend over one of said plurality of portions of said second circular arc.

18. The device defined in claim 15, wherein said receiver coils have differing numbers of turns, thereby to achieve a prescribed gradation of amplitudes at the outputs of said receiver coils.

19. A device for measuring the direction of propagation of waves comprising, in combination:
- (a) a plurality of receiver means arranged for detecting said waves;
- (b) a compensating delay line; and
- (c) switch means, connecting said receiver means with said delay line, comprising:
  - (1) a plurality of sender coils, each sender coil consisting of two spaced apart toroidal coil halves, arranged on a common axis, which are connected to one of said receiver means; and
  - (2) a plurality of receiver coils arranged in the space between said toroidal coil halves, each receiver coil being connected to a point on said delay line and movably arranged with respect to said sender coils such that each sender coil is simultaneously inductively coupled with a plurality of adjoining ones of said receiver coils, whereby said switch means provides for an interpolation between the discrete angles of incidence of said waves which would be measured if each of said sender coils were coupled to only a single receiver coil at a time.

20. The device defined in claim 19, further comprising a plurality of sender coil cores arranged in each of said sender coil halves and at least one magnetic yoke arranged with respect to said sender coil cores to provide a return path for the magnetic flux generated by said sender coils outside of said toroidal coil halves.

References Cited
UNITED STATES PATENTS

| | | | |
|---|---|---|---|
| 2,752,584 | 6/1956 | Burke | 340—6 |
| 2,902,673 | 9/1959 | Hare | 340—6 X |
| 3,108,251 | 10/1963 | Corbett | 340—6 X |

RICHARD A. FARLEY, *Primary Examiner.*

U.S. Cl. X.R.

340—16